Jan. 16, 1968    E. B. ZACKRISSON    3,363,867
SHELF MOUNTING BRACKET
Filed Feb. 15, 1966
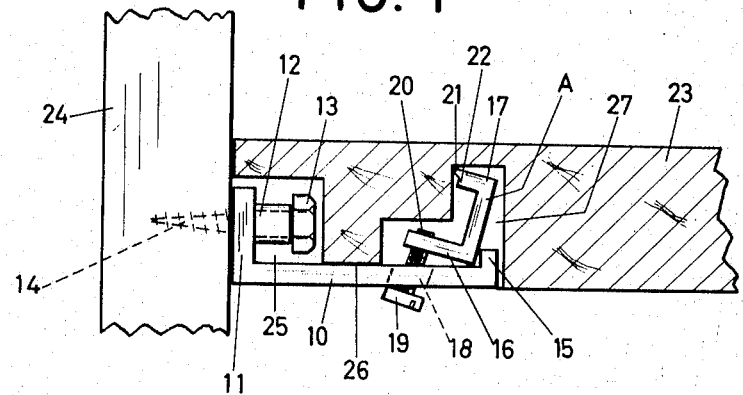
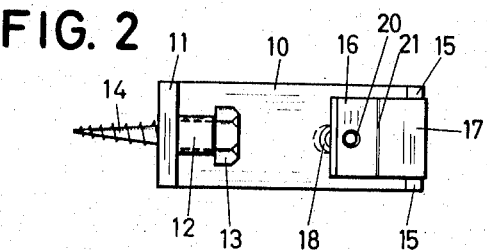
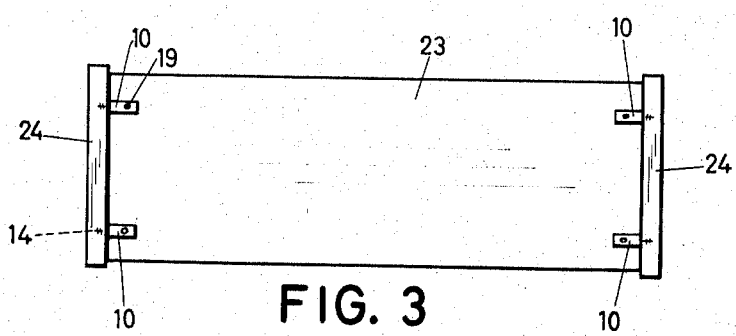
INVENTOR.
ERIC BIRGER ZACKRISSON
BY
*Linton and Linton*
ATTORNEYS

United States Patent Office 3,363,867
Patented Jan. 16, 1968

3,363,867
SHELF MOUNTING BRACKET
Eric Birger Zackrisson, Kakelosagatan 25,
Molndal, Sweden
Filed Feb. 15, 1966, Ser. No. 527,413
Claims priority, application Sweden, Feb. 27, 1965, 2,596/65
4 Claims. (Cl. 248—250)

The present invention relates to mounting devices for securing preferably wooden shelves of cabinets, bookshelves and like furnitures to sidewalls of said furnitures.

A principal object of the invention is to permit in a simple and easy manner the secure and rigid attachment of the shelves to side walls of the piece of furniture and a reliable mutual connection of said side walls.

Another important object of the invention is to provide a mounting device adapted to be concealed in a shelf and not occupying any space useful for receiving the goods such as books to be carried by the shelves.

The mounting device according to invention comprises a mounting member adapted to be rigidly secured to the side wall of a piece of furniture by securing means, said mounting member carrying a hook member operable by an adjusting screw and adapted to be recessed in a cavity in the bottom side of the shelf and by rotation of said screw to engage in the wall of said cavity. Said hook member has a sharpened end adapted to engage in the wall of said cavity and a shoulder provided beyond said end and adapted upon the rotation of said screw to exert a force on the shelf in a lateral direction against the side wall of the furniture.

Preferably said hook member constitutes an angular, double armed lever, one arm of which is connected with said adjusting screw and the other arm terminates in sharpened end. In a preferred embodiment of the invention said mounting member has an angular shape comprising a substantially horizontal shank having a shoulder which constitutes a support for the angular hook member, said horizontal shank having an aperture receiving the adjusting screw and said angular mounting member also comprising a substantially vertical shank carrying a fixing screw for securing the mounting member to the side wall of the piece of furniture.

Further objects of the present invention will be part pointed out and in part obvious in the following detailed description of the accompanying drawings, in which:

FIG. 1 is a side view of the present mounting device in its mounted position in a portion of the piece of furniture with the shelf being shown in section, FIG. 2 is a plan view of the mounting device, and FIG. 3 is a plan view on a smaller scale showing the under side of a shelf secured to the side walls of the furniture by the present mounting device.

Referring now more particularly to the accompanying drawing, in which like and corresponding parts are designated by similar reference characters, the mounting device consists of an angular mounting member having an extended straight shank 10 and a shorter shank 11 extending normal to said shank. A screw 14 having a head 13, extends through a socket 12 rigidly secured to the shank 11 without engagement of the screw thread with the socket. The end of said shank 10 opposite to said shank 11 has a transverse shoulder or flange 15 forming a support for a hook member indicated generally by A.

Said hook member is a double armed, angular lever having the general configuration of a U. One arm 16 of said lever is longer than the other arm 17.

Said shank 10 of the mounting member has an oblong aperture 18 whose longitudinal axis extends on a slant in the longitudinal direction of said shank 10. A screw 20 having a head 19, passes through the aperture 18 and is in threaded engagement with a threaded opening in the arm 16 of hook member A. The free end of the other arm 17 of this hook member is sharpened forming a point or edge 21 extending from a shoulder 22 on the arm 17.

For example, the top and the bottom shelves 23 and in high bookshelves or similar furnitures also an intermediate shelf may be connected to the preferably wooden vertical side walls 24 of the piece of furniture by the mounting devices of the present constructions. The other or intermediate shelves may be supported by conventional shelf supports in a detachable manner, if desired. The number of the mounting devices may be one, two or more for each of the self 23 depending on the size of the shelves and the load to be carried by the piece of furniture. The entire mounting device is recessed in cavities 25, 26 and 27 at the bottom side of the shelf so that the device is concealed in the piece of furniture and does not occupy any useful space in the furniture.

The shelf cavity 25 is in the end of said shelf opening in said end and opens in the bottom of said shelf. Cavity 27 has a stepped configuration extending inwardly from the bottom of said shelf and cavities 25 and 27 are bridged by cavity 26 extending therebetween and extending inwardly of the bottom of said shelf a distance substantially equivalent to the thickness of shank 10.

In the use of the present mounting device, the first step is to secure the mounting member 10, 11 to one of the furniture side walls 24 by the screw 14. By rotating the screw 20 the hook member A is moved into such a position that its arm 16 forms a suitable angle with the shank 10 of the mounting member 10, 11 permitting the shelf 23 to be placed in a position in which its cavity 25 encloses the parts 11, 12 and 13, and the cavity 27 encloses the parts A, 15 and 20. The axis of the screw 20 inclines to the horizontal plane, and by means of screw driver or spanner the screw 20 is tightened. The head 19 of this screw bears on the bottom side of the shank 10 of the mounting member 10, 11 so that the hook member A will be pivoted about the axis formed by the shoulder 15 and said angle is diminished as said screw is tightened. By this operation, the sharpened end 21 of the hook member is driven into the wood of the shelf until the shoulder 22 beyond the end 21 contacts the wall of the cavity 27 and forces the end of shelf 23 in a horizontal direction against the side wall 24 resulting in a very rigid connection between the shelf 23 and the side wall 24.

The present invention is capable of considerable modifications, and such changes thereto as come within the scope of the appended claims is deemed to be a part thereof.

I claim:

1. A mounting device for securing a shelf to a side wall of cabinets, bookshelves and like furnitures comprising a mounting member, securing means for rigidly securing said mounting member to the furniture side wall, a hook member, an adjusting screw extending through said mounting member and being in threaded engagement with said hook member and in the bottom side of the shelf having a cavity for receiving said hook member whereupon by rotation of said screw said hook member engages the wall of said cavity.

2. A mounting device as claimed in claim 1 in which said hook member has a sharpened end adapted to engage in the wall of said cavity and a shoulder provided beyond said end adapted by the rotation of said screw to force the shelf in a lateral direction against the side wall of the furniture.

3. A mounting device as claimed in claim 1 in which said hook member is an angular, double armed lever one arm of which is connected with said adjusting screw and the other arm terminates in said sharpened end.

4. A mounting device as claimed in claim 1 in which said securing means is a fixing screw, said mounting member has an angular configuration with a straight shank having a shoulder which constitutes a support for said angular hook member and an aperture receiving said adjusting screw therethrough and said angular mounting member also has a shank normal to said shank carrying said fixing screw for securing said mounting member to the side wall of the piece of furniture.

References Cited
UNITED STATES PATENTS 525,756    9/1894    Bennett _____ 108—157

ROY D. FRAZIER, *Primary Examiner.*

F. DOMOTOR, *Assistant Examiner.*